May 19, 1959     E. B. STEAR     2,887,129
LIQUID METERING DEVICE
Filed Jan. 10, 1956
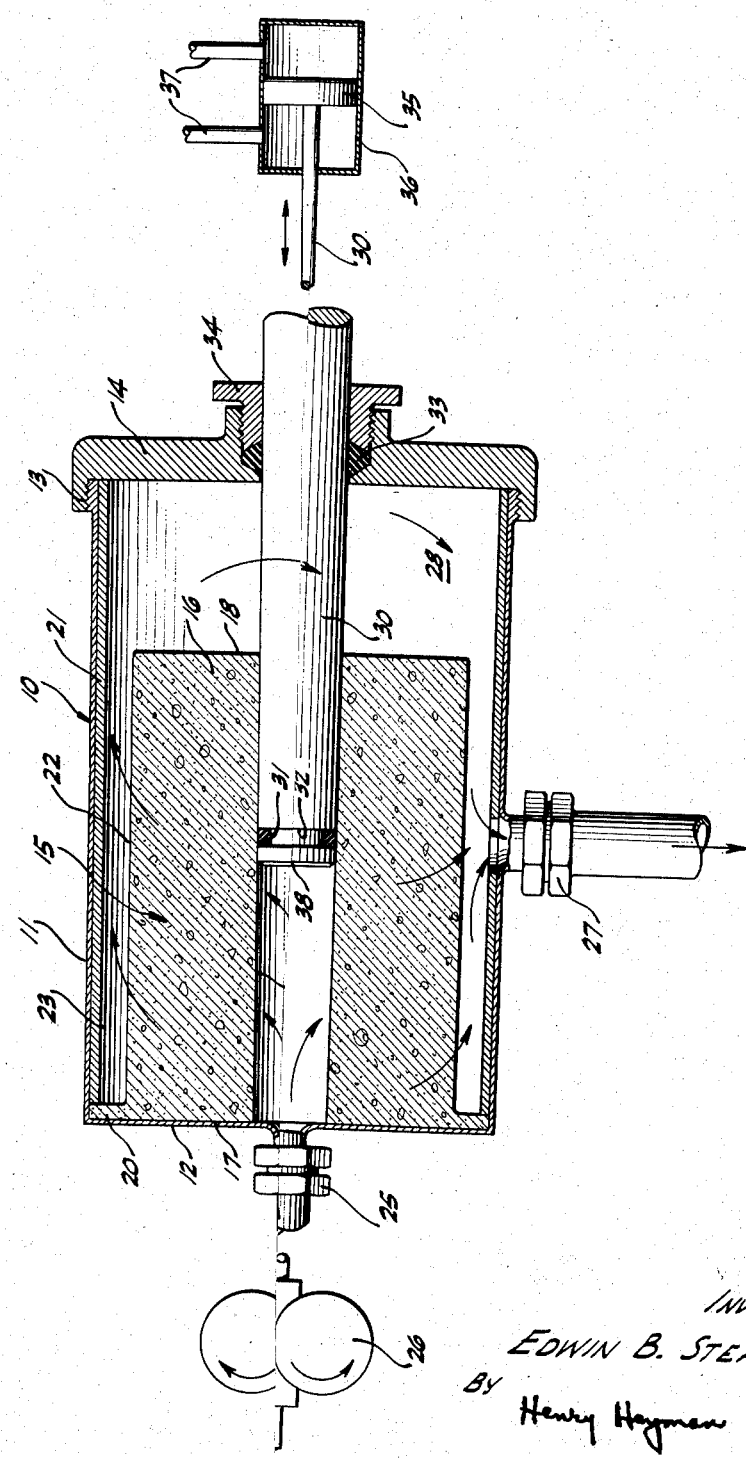
INVENTOR
EDWIN B. STEAR,
BY Henry Hayman
ATTORNEY.

United States Patent Office 2,887,129
Patented May 19, 1959

2,887,129

LIQUID METERING DEVICE

Edwin B. Stear, Los Angeles, Calif., assignor to Hughes Aircraft Company, Culver City, Calif., a corporation of Delaware Application January 10, 1956, Serial No. 558,259

1 Claim. (Cl. 138—43)

This invention relates to a liquid metering device and relates more particularly to a liquid metering device that is adapted for use in situations requiring very close liquid metering over a wide range of pressures.

In some instances, such as in the control of the flow of liquid fuel, for example, it is frequently necessary that the metering of such fuel be very carefully and precisely controlled over a wide range of pressures. Heretofore, devices utilized for a similar purpose have had serious disadvantages in that valves, etc., utilized therein have had very limited movement, thus to require very precise operating mechanism for control thereof. Due to this necessary precise condition, considerable time, effort and expense has heretofore been involved in initial setting and/or calibration of the metering structures. Additionally, due further to the beforementioned precision requirements, metering devices necessarily were complex, difficult to manufacture and expensive. These factors, coupled with the time required for setting and calibration of the units, have made prior metering devices prohibitive in some instances; have produced structures that are extremely heavy whereby to prohibit use in aircraft and the like; and have not been as reliable as necessary in most contemporary applications thereof.

It is accordingly one important object of the present invention to provide a liquid metering device having as a primary characteristic the controlling and metering of liquids over a wide range of pressures and with small, infinitely variable step increases and decreases in liquid flow.

It is another important object of this invention to provide a novel liquid metering device wherein control mechanisms employed therewith are adapted for movement over relatively large distances for small increase or decrease in metered liquid flow.

It is a further important object of this invention to provide a liquid metering device that is extremely simple in construction, reliable in operation, efficient in use and inexpensive in manufacture.

Still another object of this invention is to provide a liquid metering device employing a porous element and wherein means are provided to vary the area or volume of the element through which the liquid may be passed.

Other and further important objects of this invention will become apparent from disclosures in the following detailed specification, appended claim and accompanying drawing, wherein:

The single figure of the drawing represents a partially schematic cross-sectional view of the liquid metering device hereof.

With reference to the drawing, the device of this invention includes an enclosure or housing structure 10 having an annular side wall 11 and an integral end wall 12. Another end of the housing 10, remote from the end wall 12, is provided with external threads 13 to which a removable closure member 14 may be threadably attached.

A porous element, indicated generally at 15 is positioned within the housing 10. The porous element 15 has a main body portion 16, end walls or surfaces 17 and 18 and a radially extending flange 20 disposed outwardly from one end thereof. The end wall 17 of the element 15 is positioned in contact with an inner surface of the housing end wall 12 and retained therein by means of a cylindrical sleeve 21 that is disposed in contact with an inner surface of the side wall 11 of the housing and retained therein by end abutment with an inner surface of the closure member 14. In this connection, it is to be understood that the particular means for retaining the porous element 15 within the housing 10 has been described and illustrated by way of example only, and that other suitable means may be employed without departing from the spirit and scope hereof.

The porous element 15 has an outer annular surface 22 that is spaced from the housing 10 and particularly from an inner surface of the sleeve 21, thus to define an annular space 23 about the outer surface 22 of the element 15. The element 15 is further provided with an axially disposed annular bore 24 therethrough. The element 15 may be made from any suitable porous material such as, for example, sintered materials of either stainless steel, bronze, titanium, or the like, or may be made from such materials as porous ceramic or porcelain, as may be dictated by the particular liquid that is to be metered. The porosity of the element 15 may also be varied in accordance with use requirements.

A liquid inlet connection, indicated generally at 25, is carried by the end wall 12 of the housing 10 and communicates with one end of the bore 24 in the element 15. Liquid is adapted for force delivery through the connection 25 by means of any suitable device such as, for example, a pump 26, or the like. An outlet connection 27 is carried by the side wall 11 of the housing 10 and communicates through the sleeve 21 with the interior of the housing 10. The outlet connection 27 is adapted for reception of liquid from about the element 15 and particularly either from the annular space 23 or an end space 28 between the end 18 of the element 15 and the closure member 14.

In order to provide the necessary control relative to the area or volume of the element 15 that is exposed for passage of liquid therethrough, a plunger 30 is slidably positioned in the bore 24. The inner end of the plunger 30 may be provided with a seal 31 positioned in an annular groove 32, the seal 31 being cooperable with the surface of the bore 24. In this connection, the seal 31 may also be carried by the element 15 and cooperable with the outer surface of the plunger 30 without departing herefrom. The plunger 30 extends outwardly from the housing 10 and particularly through a gland 33 carried by the end closure 14 and retained in position by means of a threadably disposed compression member 34. Slidable movement of the plunger 30 relative to the element 15 may be controlled by any suitable means such as, for example, a piston 35 positioned within a housing 36 and having fluid connections 37 for motivating the piston 35 in one direction or another.

It may thus be seen that liquid introduced under pressure through the inlet connection 25 will flow into the bore 24, through the body 16 of the porous element 15, into the spaces 23 and 28 and outwardly through the outlet connection 27. The position of the plunger 30 in the bore 24 is adapted to control the area of exposure of the element 15 to the liquid being metered. In other words, reduced liquid flow is accomplished by positioning an inner end 38 of the plunger 30 in close approximation to the inlet connection 25, while increased liquid flow is accomplished by positioning the plunger end 38 closer to the end surface 18 of the element 15. Due to the fact that the element 15 is relatively long and the porosity thereof is established in accordance with required control conditions and viscosity of the liquid being metered, the distance of movement of the plunger 30 in the bore 24 may be considerable for small increases or decreases in flow rate of the liquid. Thus, the necessary initial calibration and/or setting of the device need not be precise nor need movement for the plunger be accurately maintained to provide for accurate liquid flow control and metering within practical limits.

In some instances it may be desirable to alter the configuration of the element 15 as by making this element considerably longer and with reduced radial dimensions. In such an instance greater accuracy may be obtained in flow control and metering of liquids, as may be desired. Thus, the present device provides considerable flexibility as far as detail design characteristics are concerned, in order to enable use thereof in a wide variety of installational situations.

Having thus described the invention and the present embodiment thereof, it is desired to emphasize the fact that many modifications may be resorted to in a manner limited only to a just interpretation of the following claim.

What is claimed is:

A liquid metering device comprising, in combination: an annular housing; a sintered metal porous element positioned in said housing and having an outer surface annularly spaced from an interior of said housing; an elongated annular bore through said porous element; a liquid inlet connection carried by said housing for delivering liquid to one end of said bore; a liquid outlet connection carried by said housing for receiving liquid from said annular space about said porous element; a plunger slidably disposed in the other end of said bore and extending outwardly from said housing; a gland about said plunger and carried by said housing; a seal carried by said plunger and cooperable with said bore; and means for slidably positioning said plunger in said bore whereby to control the area of said bore exposed to liquid delivered through said inlet and to meter flow of said liquid.

References Cited in the file of this patent

UNITED STATES PATENTS

| 677,893 | Maignen | July 9, 1901 |
| 1,140,420 | Thomas | May 25, 1915 |
| 1,671,463 | Boddie | May 29, 1928 |
| 2,006,865 | Lake | July 2, 1935 |
| 2,576,610 | Kunzog | Nov. 27, 1951 |
| 2,635,641 | Kasten | Apr. 21, 1953 |

FOREIGN PATENTS

| 669,448 | Great Britain | Apr. 2, 1951 |